United States Patent
Eurin

(10) Patent No.: US 9,227,299 B2
(45) Date of Patent: Jan. 5, 2016

(54) METHOD OF MANUFACTURING AN OPTICAL LENS

(71) Applicant: ESSILOR INTERNATIONAL (COMPAGNIE GENERALE D'OPTIQUE), Charenton le Pont (FR)

(72) Inventor: Brigitte Eurin, Charenton le Pont (FR)

(73) Assignee: ESSILOR INTERNATIONAL (COMPAGNIE GENERALE D'OPTIQUE), Charenton le Pont (FR)

(*) Notice: Subject to any disclaimer, the term of this patent is extended or adjusted under 35 U.S.C. 154(b) by 12 days.

(21) Appl. No.: 14/365,986

(22) PCT Filed: Dec. 6, 2012

(86) PCT No.: PCT/EP2012/074638
§ 371 (c)(1),
(2) Date: Jun. 16, 2014

(87) PCT Pub. No.: WO2013/087504
PCT Pub. Date: Jun. 20, 2013

(65) Prior Publication Data
US 2014/0364039 A1    Dec. 11, 2014

(30) Foreign Application Priority Data
Dec. 15, 2011  (EP) ..................................... 11306669

(51) Int. Cl.
*B24B 13/005*  (2006.01)
*B24B 49/12*   (2006.01)
*B29D 11/00*   (2006.01)

(52) U.S. Cl.
CPC ............. *B24B 49/12* (2013.01); *B24B 13/0055* (2013.01); *B29D 11/00942* (2013.01); *B29D 11/00951* (2013.01)

(58) Field of Classification Search
CPC .. B24B 49/12; B24B 13/0055; B24B 13/005; B24B 13/00; B24B 13/06; B24B 49/00; B29D 11/00942; B29D 11/00951; B29D 11/00
USPC .................................... 451/5, 6, 42, 384, 390
See application file for complete search history.

(56) References Cited

U.S. PATENT DOCUMENTS

| | | | |
|---|---|---|---|
| 2,307,501 A * | 1/1943 | Goddu et al. .................. | 33/18.1 |
| 2,557,295 A * | 6/1951 | Kidwell .......................... | 101/41 |
| 3,589,079 A * | 6/1971 | Beasley ........................ | 451/460 |
| 5,421,771 A * | 6/1995 | Wardle .......................... | 451/390 |
| 5,505,654 A * | 4/1996 | Wood et al. ...................... | 451/6 |

(Continued)

FOREIGN PATENT DOCUMENTS

EP    2 199 021    6/2010

*Primary Examiner* — George Nguyen
(74) *Attorney, Agent, or Firm* — Cozen O'Connor

(57) ABSTRACT

A method of manufacturing an optical lens, comprising: providing a lens member comprising a first surface and a first reference system identified by engraved markings on the first surface, providing surface data corresponding to a second surface of the optical lens to be manufactured, providing second markings on the lens member defining a second reference system, providing marking positioning error between the second markings and the engraved markings, providing an adhesive tape on the first surface of the lens member, and a manufacturing step during which the second surface of the optical lens is manufactured according to the surface data and the marking positioning error such that the relative position of the first and second surfaces is respected.

11 Claims, 5 Drawing Sheets

(56) References Cited

U.S. PATENT DOCUMENTS

| | | | |
|---|---|---|---|
| 6,036,013 A * | 3/2000 | Chen | 206/347 |
| 6,187,159 B1 * | 2/2001 | Kamura et al. | 204/298.15 |
| 6,328,628 B1 * | 12/2001 | Mizuno et al. | 451/5 |
| 7,080,907 B2 * | 7/2006 | Andrews et al. | 351/159.69 |
| 7,189,147 B2 * | 3/2007 | Igarashi et al. | 451/42 |
| 7,332,045 B2 * | 2/2008 | Shanbaum | 156/64 |

\* cited by examiner

METHOD OF MANUFACTURING AN OPTICAL LENS

RELATED APPLICATIONS

This application is a U.S. National Phase Application under 35 USC 371 of International Application PCT/EP2012/074638 filed Dec. 6, 2012.

This application claims the priority of European application No. 11306669.0 filed Dec. 15, 2011, the entire content of which is hereby incorporated by reference.

FIELD OF THE INVENTION

The present invention relates to a method of manufacturing an optical lens, in particular an ophthalmic lens or spectacle lens.

BACKGROUND OF THE INVENTION

An optical lens is typically made of plastic or glass material and generally has two opposing surfaces which co-operate with one another to provide a required corrective prescription. When the positioning or shape of one of these surfaces with respect to the other is inaccurate, optical errors can be created.

Manufacturing of an optical lens to the required prescription requirements typically includes machining the surface of a semi finished lens or lens blank. Typically, a semi-finished lens has a finished surface, for example the front surface and an unfinished surface, for example the back surface. By machining the back surface of the lens to remove material, the required shape and positioning of the back surface with respect to the front surface for the desired corrective prescription can be generated.

During manufacturing of the lens it is important that the semi finished lens is securely maintained in an accurate position on a blocker during the various manufacturing operations in order to prevent the generation of optical errors.

Conventionally, a semi-finished lens is provided with engraved markings on the finished surface. The engraved markings define a reference system of the design of the finished surface of the lens.

So as to manufacture accurately the unfinished surface of the semi-finished lens, the semi-finished lens is maintained by blocking the finished surface of the lens on a blocker. Various materials may be employed to secure the semi-finished lens to the blocker. These materials include glues and low temperature fusible metal alloys.

The use of such materials requires that the finished surface of the lens be protected prior to being blocked on the blocker. An adhesive tape is generally placed on the finished surface prior to blocking the semi-finished lens.

The adhesive tape can make the viewing of the engraved markings, for example trough the semi-finished lens, difficult. Thus, it may be difficult to accurately determine the position in which the semi-finished lens is blocked. An inaccurate position of the semi-finished lens on the blocker may create optical errors in the final lens.

SUMMARY OF THE INVENTION

One object of the present invention is to provide a method of manufacturing an optical lens that increases the accuracy of the positioning of both surfaces of the optical lens with respect of one to the other.

In accordance with a first aspect of the invention there is provided a method of manufacturing an optical lens. The method comprises:
- a lens member providing step during which a lens member comprising a first surface and a first reference system identified by engraved markings on the first surface are provided,
- a surface data providing step during which surface data corresponding to a second surface of the optical lens to be manufactured are provided,
- a second markings providing step during which second markings are provided on the first surface defining a second reference system,
- a marking positioning error providing step during which a marking positioning error between the second markings and the engraved markings is provided,
- taping step during which an adhesive tape is provided on the first surface of the lens member,
- a manufacturing step during which the second surface of the optical lens is manufactured according to the surface data and the marking positioning error such that the relative position of the first and second surfaces is respected.

The method according to the invention uses second markings and takes into accounts the errors between the engraved and second markings so as to provide an accurate relative position of both surfaces of the final optical lens.

According to further embodiments which can be considered alone or in combination:
- during the marking positioning error providing step the engraved markings and the second markings are compared in order to determine a marking positioning error to be provided,
- the second markings are provided on the first surface of the lens member;
- the second markings are surface markings, for example printed on the first surface of the lens member;
- the manufacturing step comprises:
  - a blocker providing step during which a blocker with a blocker reference system is provided,
  - a blocking step during which the lens member is blocked on the blocker in a blocking position, the blocking position being determined with respect to the blocker reference system so as to compensate the marking positioning error;
- the manufacturing step comprises:
  - a blocker providing step during which a blocker with a blocker reference system is provided,
  - a blocking step during which the lens member is blocked on a blocker in a blocking position,
  - a configuration step during which the operational parameters of a lens machining tool are configured according to the marking positioning error such that the relative position of the first and second surfaces is respected;
- the manufacturing step comprises:
  - a blocker providing step during which a blocker is provided with the blocker reference system,
  - a blocking step during which the lens member is blocked on a blocker in a blocking position,
  - a comparing step during which the blocking positioning error between the second reference system and the blocker reference system is determined,
  - a configuration step during which the operational parameters of a lens machining tool are configured according to the blocking positioning error such that the relative position of the first and second surfaces is respected;

the method further comprises viewing the second markings through the lens member and wherein the refractive properties of the lens member are taken into account when determining the positioning of the second markings;

after the manufacturing step, the method further comprises a further marking step during which further markings are engraved on the manufactured second surface according at least to the marking positioning error;

the second markings are removed after the second surface is manufactured.

Another aspect of the invention relates to a computer program product for a data processing device, the computer program product comprising a set of instructions which, when loaded into the data processing device, causes the data processing device to perform the method according to the invention.

Another aspect of the invention relates to a computer-readable medium having computer-executable instructions to enable a computer system to perform the method according to the invention.

Unless specifically stated otherwise, as apparent from the following discussions, it is appreciated that throughout the specification discussions utilizing terms such as "computing", "calculating", or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

Embodiments of the present invention may include apparatuses for performing the operations herein. This apparatus may be specially constructed for the desired purposes, or it may comprise a general purpose computer or Digital Signal Processor ("DSP") selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs) electrically programmable read-only memories (EPROMs), electrically erasable and programmable read only memories (EEPROMs), magnetic or optical cards, or any other type of media suitable for storing electronic instructions, and capable of being coupled to a computer system bus.

The processes and displays presented herein are not inherently related to any particular computer or other apparatus. Various general purpose systems may be used with programs in accordance with the teachings herein, or it may prove convenient to construct a more specialized apparatus to perform the desired method. The desired structure for a variety of these systems will appear from the description below. In addition, embodiments of the present invention are not described with reference to any particular programming language. It will be appreciated that a variety of programming languages may be used to implement the teachings of the inventions as described herein.

BRIEF DESCRIPTION OF THE DRAWINGS

Embodiments of the invention will now be described, by way of example only, and with reference to the following drawings in which.

DETAILED DESCRIPTION OF THE DRAWINGS

Elements in the figures are illustrated for simplicity and clarity and have not necessarily been drawn to scale. For example, the dimensions of some of the elements in the figure may be exaggerated relative to other elements to help improve the understanding of the embodiments of the present invention.

In the sense of the invention, a "Design" is a widely used wording known from the man skilled in the art to designate the set of parameters allowing to define an optical function of a generic optical system; each ophthalmic lens manufacturer has its own designs, particularly for aspherical lens and for progressive lens. As for an example, a progressive lens "design" results of an optimization of the progressive surface so as to restore a presbyope's ability to see clearly at all distances but also to optimally respect all physiological visual functions such as foveal vision, extra-foveal vision, binocular vision and to minimize unwanted astigmatisms. Progressive lens "designs" are tested through rigorous clinical trials before being commercialized.

In the context of the present invention the term "lens member" can refer to a lens blank, an uncut lens, a semi-finished lens. It will be understood that the method can thus be applied to any stage of the manufacturing process of an ophthalmic lens.

Figure 1:
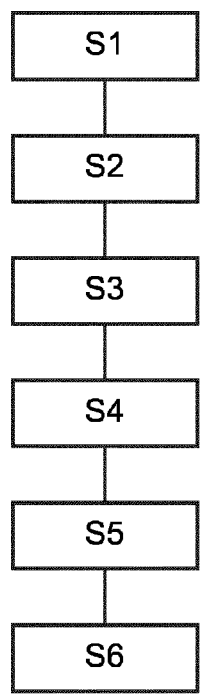
FIG. 1 is a flowchart of the steps of an embodiment of the method according to the invention.

As illustrated on FIG. 1, according to an embodiment of the method according to the invention comprises:
a lens member providing step S1,
a surface data providing step S2,
a second markings providing step S3,
a marking positioning error providing step S4,
a taping step S5, and a manufacturing step S6.

During the lens member providing step S1 a semi finished lens member is provided.

Figure 2A:
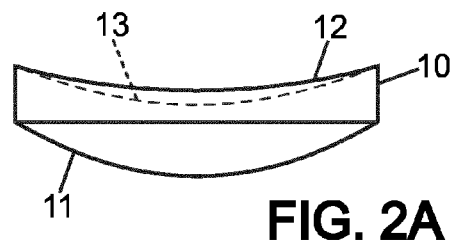
FIG. 2A is a perspective view of an optical lens member to be manufactured according to embodiments of the invention.

As represented on FIG. 2A a semi finished lens member 10 has a first surface with a first design, for example a preformed front surface. In use of the resulting finished optical lens, the preformed front surface 11 is disposed nearest the object being viewed and a second surface 12 to be modified by the manufacturing process to provide for example the back surface 13 of the finished optical lens, represented by the dotted line. Second surface 12 is machined by a machining tool so that the back surface 13 is orientated with respect to and distanced from the front surface 11, according to the required optical prescription.

While in this embodiment of the invention, the first surface is the front surface of the semi-finished lens member and the second surface is the back surface, it will be understood, that in alternative embodiments of the invention the first surface may be the back surface of the semi-finished lens member and the second surface may be the front surface.

Furthermore, while in this embodiment of the invention, the back surface of the optical lens is formed by the machining process, it will be understood, that in alternative embodiments of the invention both or either surfaces of the lens may be formed by the machining process.

Moreover, although the surface 13 to be manufactured is represented in FIG. 2A as concave, it will be appreciated that this surface 13 could equally well be convex or any other curved surface.

Figure 2B:
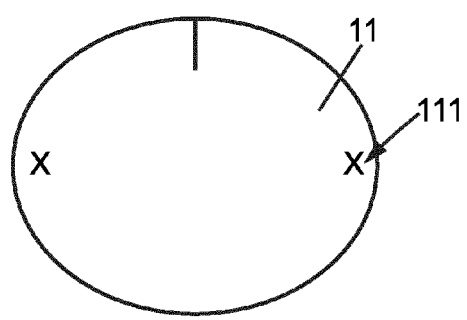
FIG. 2B is a planar view of a preformed surface of a semi finished lens member to be machined according to embodiments of the invention.

With reference to FIG. 2B, engraved markings 111 are provided on the preformed front surface 11 of the semi finished lens member 10 as reference features for defining a first reference system for positioning of the first design of the preformed front surface.

The engraved markings 111 have a depth of a few micrometers so as to limit the risk of disturbing the wearer of the resulting finished optical lens.

During the surface data providing step S2, surface data corresponding to a second surface of the optical lens to be manufactured are provided. The surface data correspond to the surface to be manufactured on the second surface 12 so that the optical lens combining the manufactured back surface 13 and the front surface provides the required optical function. The surface data can be determined according to the front preformed surface and the wearer's prescription.

Figure 2C:
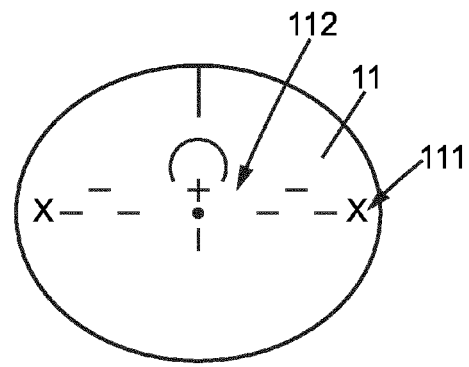
FIG. 2C is a planar view of a preformed surface of a semi finished lens member to be machined with engraved and second markings.

During the second marking providing step S3, as represented on FIG. 2C, second markings are provided on the lens member defining a second reference system. The second markings are provided so as to more clearly and precisely identify the first reference system of the first surface. In particular, the inventors have observed that once the first surface of the lens member is recovered with an adhesive tape prior to the blocking step, the engraved markings 111 become difficult to detect. The use of second markings helps the operator to determine the position of the design on the first surface for the blocking step.

The second markings can be surface markings, for example printed on either surfaces of the lens member.

According to an embodiment of the invention, the second markings are temporary markings that are placed on either surfaces of the lens member. For example, an erasable ink can be used for making the second markings. Advantageously, according to such embodiment, the second markings can easily be wasted away so as to clear the final surfaces of the optical lenses.

According to another embodiment of the invention, the second markings can be made by etching deeper markings than the engraved markings 111 on the periphery of the lens member. For example the engraved markings 11A are of the order of a few micrometer and the second markings can be in the order of a tenth of millimeters.

Advantageously, deeper engraved markings are easier to detect once the first surface of the lens member is recovered with an adhesive tape and having such marking on the periphery of the lens member reduce the risk of having such markings on the final optical lens the wearer will be using.

According to an embodiment of the invention, the second markings are provided on the first surface of the lens member so as to reduce the difference between the first and second reference system.

According to an embodiment of the invention, the second markings are provided on the second surface so as to be easily viewed during the marking positioning error providing step S4.

According to an embodiment of the invention, during the marking positioning error providing step S4, the engraved markings and the second markings are compared. Such comparison provides a marking positioning error between the second markings and the engraved markings. The marking positioning error represents the difference in position between the first reference system and the second reference system.

Figure 3:
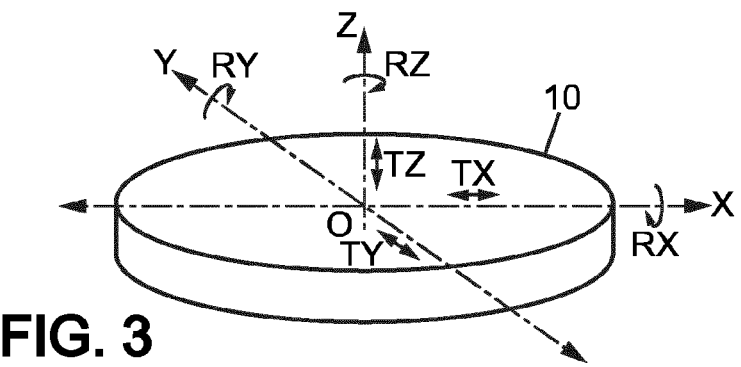
FIG. 3 is a perspective view of a lens member illustrating the reference frame of the lens member.

With reference to FIG. 3 the positioning of the second reference system can be defined by:
 translation TX and TY in a horizontal plane XY with decentration TX, TY, defining the displacement of the centration point O of the reference system in the X and Y direction, respectively in the horizontal plane;
 translation TZ along a vertical axis,
 orientation RZ of the reference system about the vertical Z axis also referred to as orientation of the nasal-temporal X axis of the lens member;
 orientation RY of the reference system about the horizontal Y axis,
 orientation RX of the reference system about the horizontal X axis.

The positioning of the second markings on the lens member can then be quantified using a digital camera 36.

Figure 4:
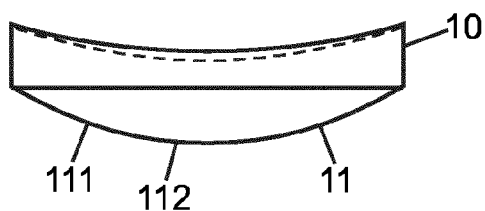
FIG. 4 is a schematic view of a digital camera viewing the lens member according to an embodiment of the invention.

For example, the engraved markings 111 and the second markings 112 are viewed through the lens member 10 by means of a camera 36 as illustrated in FIG. 4.

Figure 5:
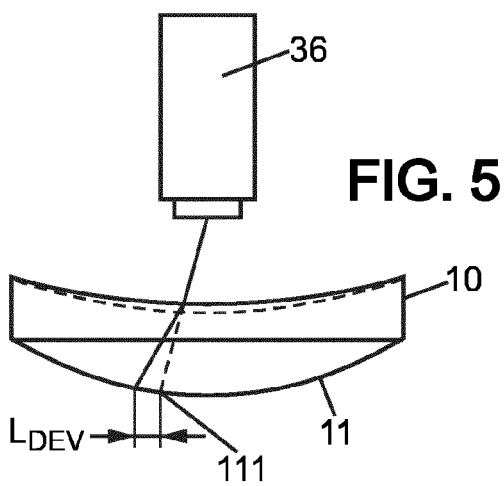
FIG. 5 schematically illustrates the effect of the refractive properties of the lens member 10 on the determination of the position of the markings of the lens member.

Deviation Ldev of the image of the first and second markings 111 located on the front surface 11 of the lens member 10 due to refractive properties of the lens member 10 is taken into account when making measurements of the positioning of engraved markings 111 relative to the second markings as illustrated in FIG. 5.

Figure 6:
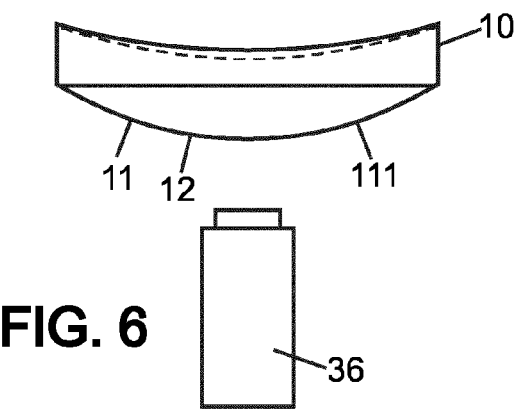
FIG. 6 is a schematic view of a digital camera viewing the lens member according to an embodiment of the invention.

Although in this embodiment the engraved and second markings 11 are viewed through the lens member 10, it will be appreciated that in alternative embodiments of the invention the engraved and second markings may be viewed directly by placing the camera on the lower side of the lens member such that it views the engraved and second markings of the lens member as illustrated in FIG. 6.

Figure 7:
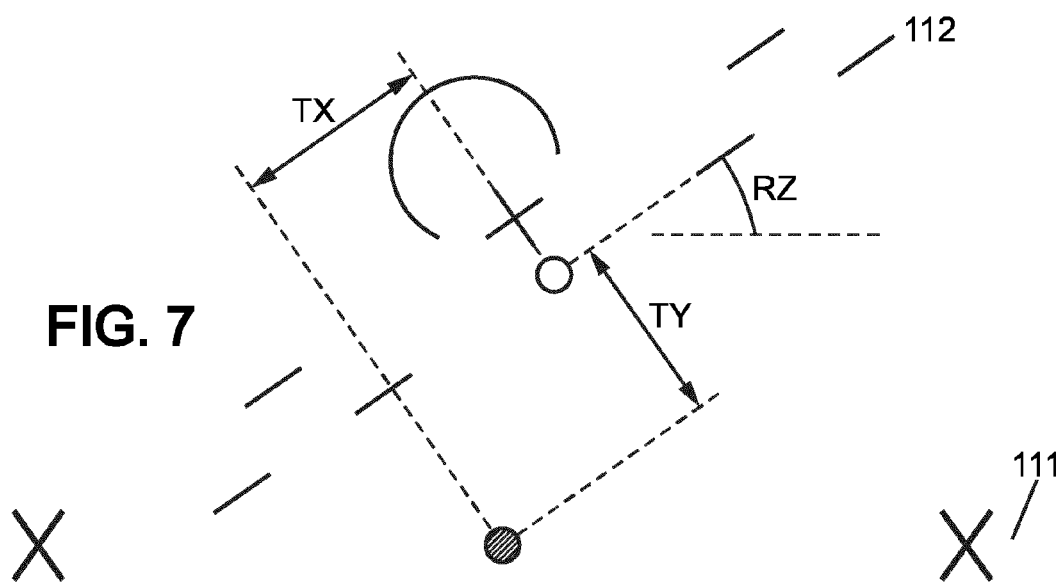
FIG. 7 schematically illustrates determining the positioning of the reference markings according to an embodiment of the invention.

Using the camera 36 the operator can determine the marking positioning error between the engraved markings 111 and the second markings 112 as illustrated on FIG. 7.

The orientation and direction RZ of the nasal temporal axis of the semi finished lens member 10 is determined by measuring the orientation of the axis of the engraved markings 111 with respect to the axis of the second markings 112. Using the central reference point of the engraved markings 111 the translation distances in the horizontal plane TX and TY can also be measured, i.e. the decentration or off centering of the second reference system.

Once the three degrees of freedom RZ, TX and TY have been determined the remaining three degrees of freedom TZ, RX and RY may be mathematically deduced therefrom by taking account of the geometry of lens member.

Once the marking positioning error has been determined the actual positioning of the first surface 11 of the lens member is known. The required positioning of the surface 13 to be generated with respect to the first can thus be deduced.

During the taping step S5, the front surface of the lens member is taped with an adhesive tape so as to protect the first surface during the manufacturing step S6.

Examples of suitable adhesive tapes are given in U.S. Pat. No. 6,036,013.

During the manufacturing step S6, the second surface of the optical lens is manufactured according to the surface data and the marking positioning error such that the desired optical properties of the optical lens are respected.

Figure 8:
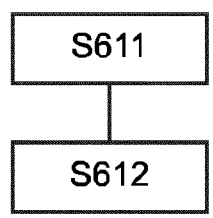
FIG. 8 is a flowchart of the machining step of an embodiment of the method according to the invention.
Figure 9A:
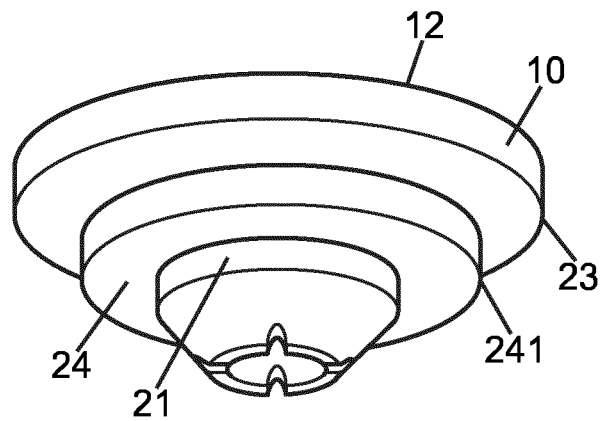
FIG. 9A is a cross-sectional view of a lens member and blocking device according to an embodiment of the invention.
Figure 9B:
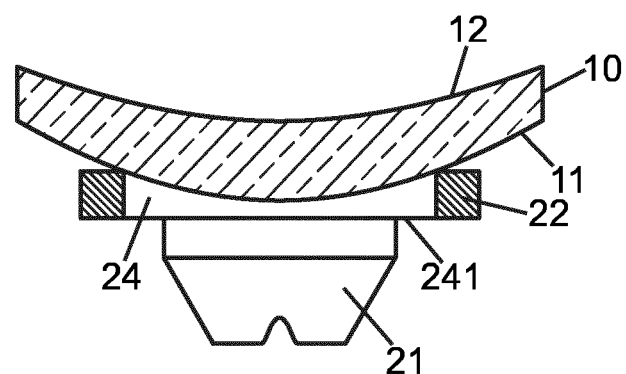
FIG. 9B is a perspective view of a lens member and blocking device according to an embodiment of the invention.

As illustrated on FIG. 8, the manufacturing step S6 may comprise:
 a blocker providing step S611, and
 a blocking step S612.
Referring now to FIGS. 9A and 9B, a lens blocking device 20 for blocking lens member 10 in the correct positioning for manufacturing processes comprises a blocker 21 and a blocking ring 22. Blocking cast material 24 is poured into the cavity defined by the lower surface of the optical lens 10, the blocker 21 and the blocking ring 22. The blocking cast material 24 cools to solidify in order to provide a blocking support for the optical lens 10 at the desired positioning for machining. The lower surface or bearing surface 241 of blocking material 24 acts as a reference surface for determining the thickness at the centre of the lens member 10.

Figure 10:
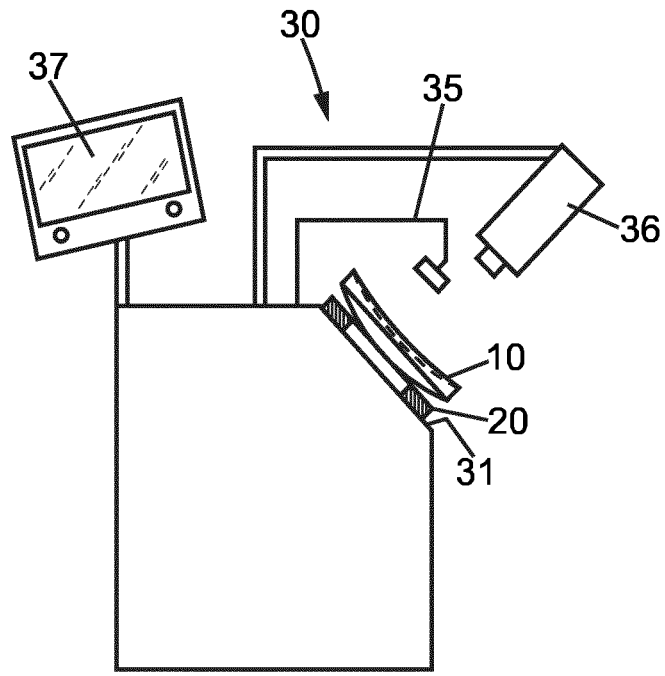
FIG. 10 is schematic view of a lens member on a blocking station according to the first embodiment of the invention.

Lens blocking device 20 is part of a blocking station 30 as illustrated in FIG. 10. Blocking station 30 comprises the blocking device 20 disposed on a top plate 31 of the blocking station 30 and a clamping arm 35 which may be moved from a free position to a clamping position in which it holds the lens member 10 in place on the blocking device 20. Blocking station 30 also includes a digital camera 36 for taking an image of the positioning of the lens member 10 on the blocking device 20, and a screen 37 for viewing the image from the digital camera 36. The lens member 10 may also be directly viewed by an operator without using the digital camera 36.

Figure 11:
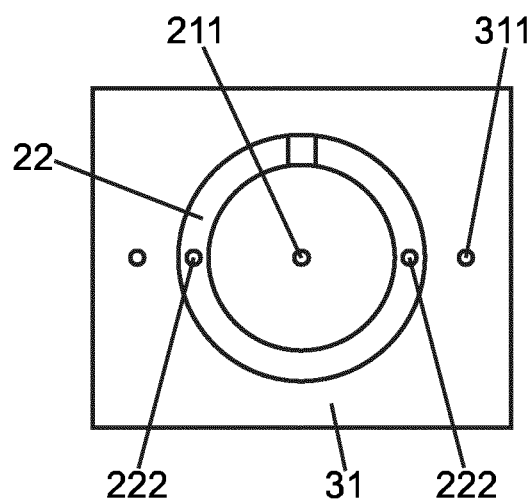
FIG. 11 is a planar view of the contact surface of the blocking device and blocking plate of the blocking station of FIG. 10.

Referring to FIG. 11, blocking device 20 is provided with blocker reference markings including alignment markings 222 provided on the blocking ring 22 and a central marking 211. In the case where an insert or a block is provided in the centre of the blocking ring, the central marking 211 is provided on the insert or block. The top plate 31 of the blocking station 30 is provided with reference markings 311 for guiding the positioning of the blocking ring 22 on the top plate 31. Alignment markings 222 on the ring may include a hole for receiving corresponding positioning projections on the top plate 31 allowing the ring 22 to be correctly positioned on the blocking plate 31. The alignment markings 222 may be further provided with a line markings following a reference axis to aid alignment.

Prior to placing the semi finished lens member 10 on the lens blocking device 20 the protection film 23 is placed on the preformed front surface 11 of the lens member 10. The blocking step involves placing the semi finished lens member 10 on the lens blocking device 20. The lens member 10 is positioned on the blocking device 20 with the preformed surface, which in this case is the front surface 11, being placed facing towards and in contact with the blocking device 20. The surface 12 to be machined is thus orientated to face upwards away from the blocking device 20.

After the lens member 10 has been placed on the blocking device 20, the operator may make an initial judgement as to the quality of the positioning by direct visualisation of the reference markings 111 of lens member 10 with respect to the reference markings of the blocking device 20 before continuing the blocking process. If the operator is not satisfied with the initial positioning, the lens member 10 may be repositioned manually or automatically on the blocking device 20. Once the operator is satisfied with the positioning the clamping arm 35 may be put in place to hold the lens member 10 in position on the blocking device 20.

According to an embodiment of the invention, the lens member is blocked on the blocker in a blocking position, the blocking position being determined with respect to the blocker reference system so as to compensate the marking positioning error.

As for the positioning of the second marking, as illustrated on FIG. 12, the positioning of the lens member 10 in a reference frame on lens blocking device 20 can be defined by:
 translation TX and TY in a horizontal plane XY with decentration TX, TY, defining the displacement of the centration point O of the lens in the X and Y direction, respectively in the horizontal plane;
 translation TZ along a vertical axis,
 orientation RZ of the lens member about the vertical Z axis, also referred to as orientation of the nasal-temporal X axis of the lens member;
 orientation RY of the lens member about the horizontal Y axis,
 orientation RX of the lens member about the horizontal X axis,
The positioning of lens member 10 on the blocking device 20 can then be quantified using the digital camera 36. In order to measure the positioning of the lens member 10, the second markings 112 provided on the lens member and the reference markings 211 and 222 provided on the blocking device 20 are viewed through the lens member 10 and protection film 23 by means of the camera 36 of the blocking device 20 as illustrated in FIG. 10. Deviation Ldev of the image of a reference point 111 located on the front surface 11 of the lens member 10 due to refractive properties of the lens member 10 is taken into account when making measurements of the positioning of second markings 112 of the lens member 10 relative to the reference markings on the blocking ring 22.

The positioning of the second markings 112 on the lens member relative to the reference markings 211 and 222 of the blocking device 20 is determined.

The camera 36 places the image of the second markings 112 in the reference frame of a model M112 of the second markings corresponding to an optimised positioning of the lens member 10 as illustrated in FIG. 7. The reference frame of the markings of model M112 is defined with respect to the reference frame of the blocking device 20 in a calibration step.

A calculator can determine a model M112 of the second markings corresponding to an optimised positioning of the lens member 10 so as to compensate the marking positioning error. The operator using camera 36 places the image of the second markings 112 in the reference frame of a model M112 of the reference markings so as to have the lens member in a position that will compensate the marking positioning error.

According to a further embodiment of the invention, during the blocking step S612, the lens member is blocked in a blocking position and the marking positioning error is compensated in a configuration step. During such configuration step, the operational parameters of the lens machining tool are configured according at least to the marking positioning error. For example, the data file sent to the machining tool is modified according to the marking positioning error, such modification can take place directly at the machining tool level.

The methods according to such embodiment consist in compensating for the marking positioning error rather than repositioning a lens member in order to reduce the error. There is no impact on the actual blocking operation since the compensation is performed by software, and thus no modifications to the physical blocking equipment are necessary for the methods to be implemented.

By configuring the machining tool according to the marking positioning error, the second surface 12 can be machined to provide a manufactured surface 13 with the required positioning with respect to the first surface 11 to respect the thickness and desired optical characteristics of the desired optical lens. Configuring the machining tool involves providing the tool with surface positioning data so that the machining tool may be controlled to provide the desired surface positioning of the second surface.

Alternatively, completed surface data defining the surface to be manufactured can be sent directly to the machining tool. In this case the data defining the positioning of the surface 13 to be manufactured is determined from the marking positioning error prior to configuration data being delivered to the machining tool. The machining tool is configured accordingly.

According to an embodiment of the invention, the manufacturing step comprises:
- a blocker providing step during which a blocker is provided with the blocker reference system,
- a blocking step during which the lens member is blocked on a blocker in a blocking position,
- a comparing step during which the blocking positioning error between the second reference system and the blocker reference system is determined,
- a configuration step during which the operational parameters of a lens machining tool are configured according to the blocking positioning error such that the desired optical properties of the optical lens are respected.

The blocking positioning error estimation and compensate for this error can be performed by any means know by the person skilled in the art, and in particular by the methods disclosed in the application EP 2 199 021, the content of which is included by reference.

It will be appreciated that the estimation of the positioning error may be carried out at more than one stage during the blocking procedure. For example the positioning error may be determined before the cavity of the blocking device is filled by the blocking material and once again when the lens member is mounted on the machining apparatus.

While the foregoing examples have been described with reference to the manufacture of a spectacle lens, it will be appreciated that the method of the invention may be applied more generally to the manufacture of other types of optical lens, for example optical lens used in telescopes and the like, or contact lens.

By compensating for errors in positioning, the optical quality of machined optical lens can be improved, particularly in the manufacture of dual addition lens by reducing the dispersion related to the marking stage and blocking stage of the manufacturing operation. This dispersion results from incorrect positioning of one surface of an optical lens with respect to an opposing surface.

Many further modifications and variations will suggest themselves to those skilled in the art upon making reference to the foregoing illustrative embodiments, which are given by way of example only and which are not intended to limit the scope of the invention, that being determined solely by the appended claims.

In the claims, the word "comprising" does not exclude other elements or steps, and the indefinite article "a" or "an" does not exclude a plurality. The mere fact that different features are recited in mutually different dependent claims does not indicate that a combination of these features cannot be advantageously used. Any reference signs in the claims should not be construed as limiting the scope of the invention.

The invention claimed is:

1. A method of manufacturing an optical lens, the method comprising:
   - a lens member providing step during which a lens member comprising a first surface and a first reference system identified by engraved markings on the first surface are provided;
   - a surface data providing step during which surface data corresponding to a second surface of the optical lens to be manufactured are provided;
   - a second markings providing step during which second markings are provided on the lens member defining a second reference system;
   - a marking positioning error providing step during which a marking positioning error between the second markings and the engraved markings is provided;
   - taping step during which an adhesive tape is provided on the first surface of the lens member; and
   - a manufacturing step during which the second surface of the optical lens is manufactured according to the surface data and the marking positioning error such that the relative position of the first and second surfaces is respected.

2. Method according to claim 1, wherein the second markings are provided on the first surface of the lens member.

3. Method according to claim 1, wherein the second markings are surface markings, for example printed on the first surface of the lens member.

4. Method according to claim 1, wherein the manufacturing step comprises:
   - a blocker providing step during which a blocker with a blocker reference system is provided; and
   - a blocking step during which the lens member is blocked on the blocker in a blocking position, the blocking position being determined with respect to the blocker reference system so as to compensate the marking positioning error.

5. Method according to claim 1, wherein the manufacturing step comprises:
   - a blocker providing step during which a blocker with a blocker reference system is provided;
   - a blocking step during which the lens member is blocked on a blocker in a blocking position; and
   - a configuration step during which the operational parameters of a lens machining tool are configured according to the marking positioning error such that the relative position of the first and second surfaces is respected.

6. Method according to claim 4, wherein the manufacturing step comprises:
   - a blocker providing step during which a blocker is provided with the blocker reference system;
   - a blocking step during which the lens member is blocked on a blocker in a blocking position;

a comparing step during which the blocking positioning error between the second reference system and the blocker reference system is determined; and a configuration step during which the operational parameters of a lens machining tool are configured according to the blocking positioning error such that the relative position of the first and second surfaces is respected.

7. A method according to claim 6, comprising viewing the second markings through the lens member and wherein the refractive properties of the lens member are taken into account when determining the positioning of the second markings.

8. A method according to claim 1, wherein after the manufacturing step, the method further comprises a further marking step during which further markings are engraved on the manufactured second surface according at least to the marking positioning error.

9. A method according to claim 1, wherein the second markings are removed after the second surface is manufactured.

10. A computer program product for a data processing device, the computer program product comprising a set of instructions which, when loaded into the data processing device, causes the data processing device to perform the method of claim 1.

11. A computer-readable medium having computer-executable instructions to enable a computer system to perform the method of claim 1.

* * * * *